Sept. 30, 1958 A. FRÖBEL 2,854,122
CARRIAGE DRIVE
Filed Feb. 14, 1957 6 Sheets-Sheet 2

INVENTOR.
Artur Fröbel
BY Michael S. Striker
agt.

Sept. 30, 1958 A. FRÖBEL 2,854,122
CARRIAGE DRIVE
Filed Feb. 14, 1957 6 Sheets-Sheet 4
FIG.6
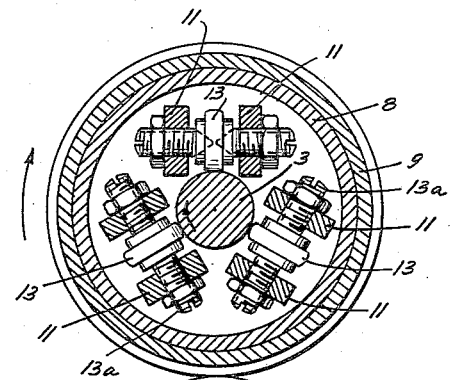
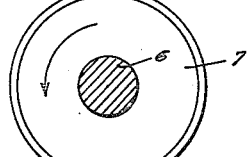
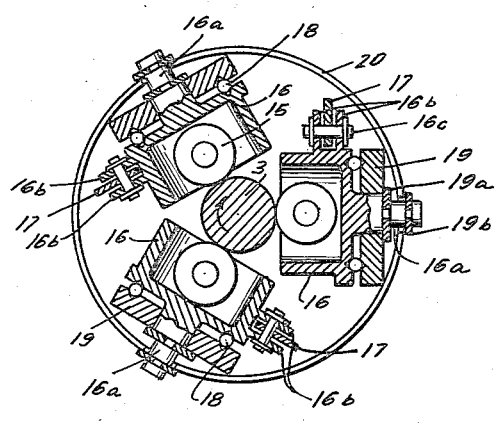
FIG.7
INVENTOR.
Artur Fröbel
BY
Michael S. Striker
agt.

Sept. 30, 1958     A. FRÖBEL     2,854,122
CARRIAGE DRIVE
Filed Feb. 14, 1957     6 Sheets—Sheet 6
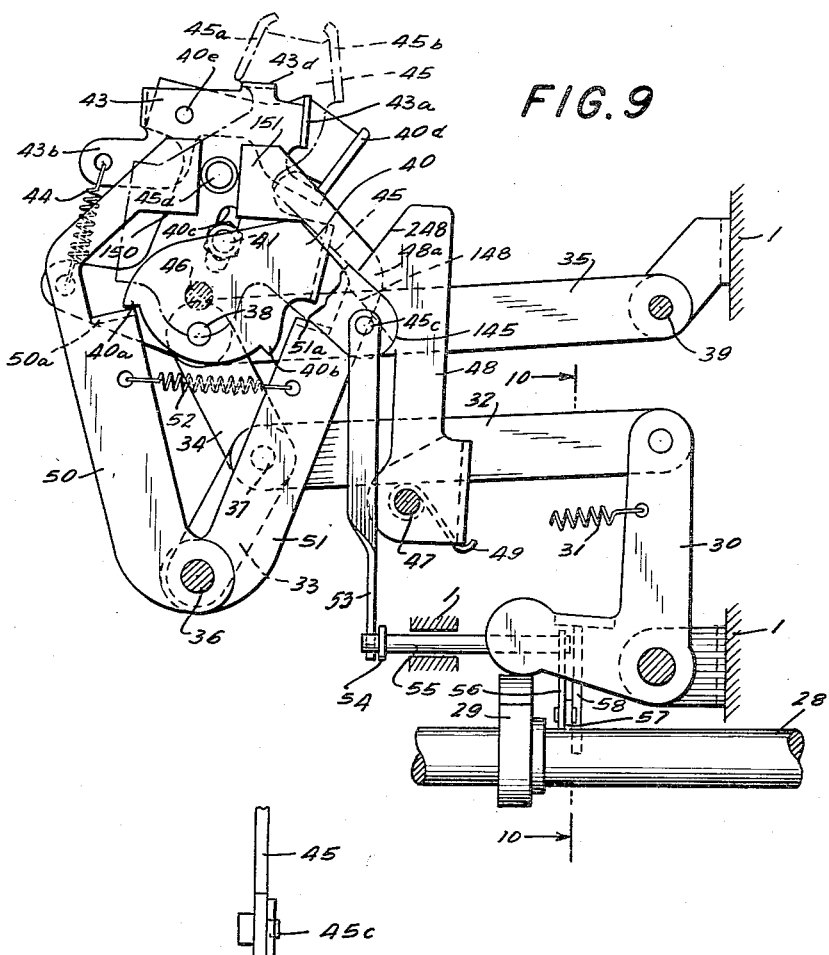
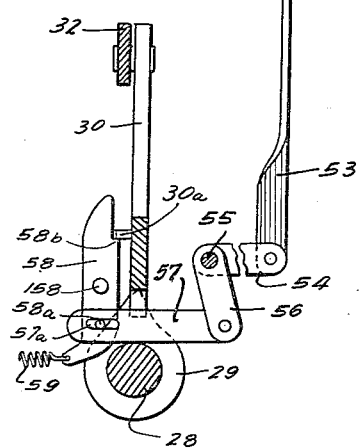
INVENTOR.
Artur Fröbel
BY Michael S. Striker United States Patent Office 2,854,122
Patented Sept. 30, 1958

2,854,122

CARRIAGE DRIVE

Artur Fröbel, Oberndorf (Neckar), Germany, assignor to Olympia Werke A. G., Wilhelmshaven, Germany Application February 14, 1957, Serial No. 640,111

30 Claims. (Cl. 197—176)

The present invention relates to a carriage drive, and more particularly to a carriage drive for a business machine, such as a typewriter or accounting machine.

The present invention relates to a carriage drive of the type in which a carriage is moved in opposite directions by a rotary drive means. Known mechanisms of this kind use a right-hand and left-hand threaded spindle which is driven from a suitable threaded member. In arrangements of this type, the reversal of the longitudinal movement requires complicated control mechanisms, and in addition, heavy wear of the spindle drive occurs. These mechanisms suffer from the fact that an impact occurs at the reversal in the end position. Furthermore, the carriage drives according to the prior art do not permit any variation in the speed of the longitudinal carriage movement.

It is one object of the present invention to overcome the disadvantages of the carriage drives according to the known art, and to provide a smoothly operating reliable carriage drive which can be inexpensively manufactured.

It is another object of the present invention to provide a carriage drive in which the reversal of the carriage movement takes place without any impact so that wear of the operating parts is prevented.

It is another object of the present invention to provide a carriage drive in which reversal of movement is obtained by gradually reducing the speed of the carriage until the same comes to a standstill and then gradually accelerating the carriage in opposite direction of movement.

Another object of the present invention is to provide a carriage drive which operates without a reduction gear between the carriage drive mechanism and the electric drive motor.

It is another object of the present invention to provide a carriage drive in which the carriage can be stopped, or reversed, without requiring stopping or reversing of the electric drive motor.

It is another object of the present invention to provide a carriage drive in which the carriage is at no time mechanically stopped by engagement between a tabulator stop or terminal stop with a stationary abutment.

A further object of the present invention is to provide a coupling means between a drive motor and a carriage which permits reciprocation of the carriage while transmitting rotary motion from a drive motor to a rotary part of the carriage.

A further object of the present invention is the provision of a tabulator and reversing mechanism for the carriages of business machines by which the carriage can be automatically stopped and reversed under the control of a cam mechanism driven by the drive motor of the machine.

With these objects in view, the present invention mainly consists in a carriage which comprises, in combination, a machine frame, a carriage mounted on the frame for reciprocating movement, a shaft means having a shaft axis extending in direction of reciprocating movement of the carriage, the shaft means being supported on the carriage for turning movement and non-movable in direction of reciprocation, a carriage transporting means mounted on the frame for turning movement and non-movable in direction of reciprocation, the carriage transporting means including at least one support and at least one transporting roller means engaging the shaft means and being mounted on the support for turning movement about a roller axis, the support and the transporting roller means being turnable about an axis transverse to the shaft axis and to the roller axis between a neutral position in which the roller axis is parallel to the shaft axis, and two transporting positions in which the roller axis is inclined in opposite directions to the shaft axis, drive means for rotating one of the means whereby the carriage is transported in one direction in one of the inclined transporting positions of the roller means, and is transported in opposite direction in the other inclined transporting position of the transporting roller means; operating means mounted on the frame and connected to the support for tunring the same about the transverse axis between the neutral and transporting positions; and control means connected to the operating means for actuating the same.

As will be described hereinafter in greater detail, the carriage can be reciprocated by rotating the shaft means, by rotating the support about the axis of the shaft means, or by rotating the transporting roller means. The control means are operated by stop means which are provided on the carriage and engage the control means during movement of the carriage.

The control means preferably include a control lever which is connected to the operating means and is shiftable between three control positions for shifting the support and the transporting roller means between the transporting positions and the neutral positions. The control means further include a control linkage having a movable member which turnably supports the control lever, and is movable together with the control lever between a first position in which the control lever is located in the path of the stop means, and a second position in which the control lever is located out of the path of the stop means. When the stop means engage the control lever during carriage movement, the control lever is shifted and shifts the support and the transporting roller means from one of the transporting positions to the neutral position so that the carriage comes to a standstill. Actuating means are provided, which are connected to the control linkage for moving the control lever between the first and the second positions when stopping of the carriage is desired.

The above described stop means are tabulator stops, and in accordance with the present invention additional terminal stops are provided for reversing the carriage movement in the end positions of the carriage. For this purpose, a reversing means is mounted on the frame of the machine shiftable between two reversing positions and operatively connected to the control lever for shifting the same between two control positions which correspond to the two transporting positions of the transporting roller means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 6 is a fragmentary cross-sectional view taken on line 6—6 in Fig. 3;

Fig. 7 is a fragmentary cross-sectional view taken on line 7—7 in Fig. 3;

Fig. 9 is a rear view illustrating the control means and the reversing means in a different operational position; and Fig. 10 is a fragmentary cross-sectional view taken on line 10—10 in Fig. 9 and illustrating locking means for rendering inoperative the tabulator stops during the return movement of the carriage.

Figure 1:
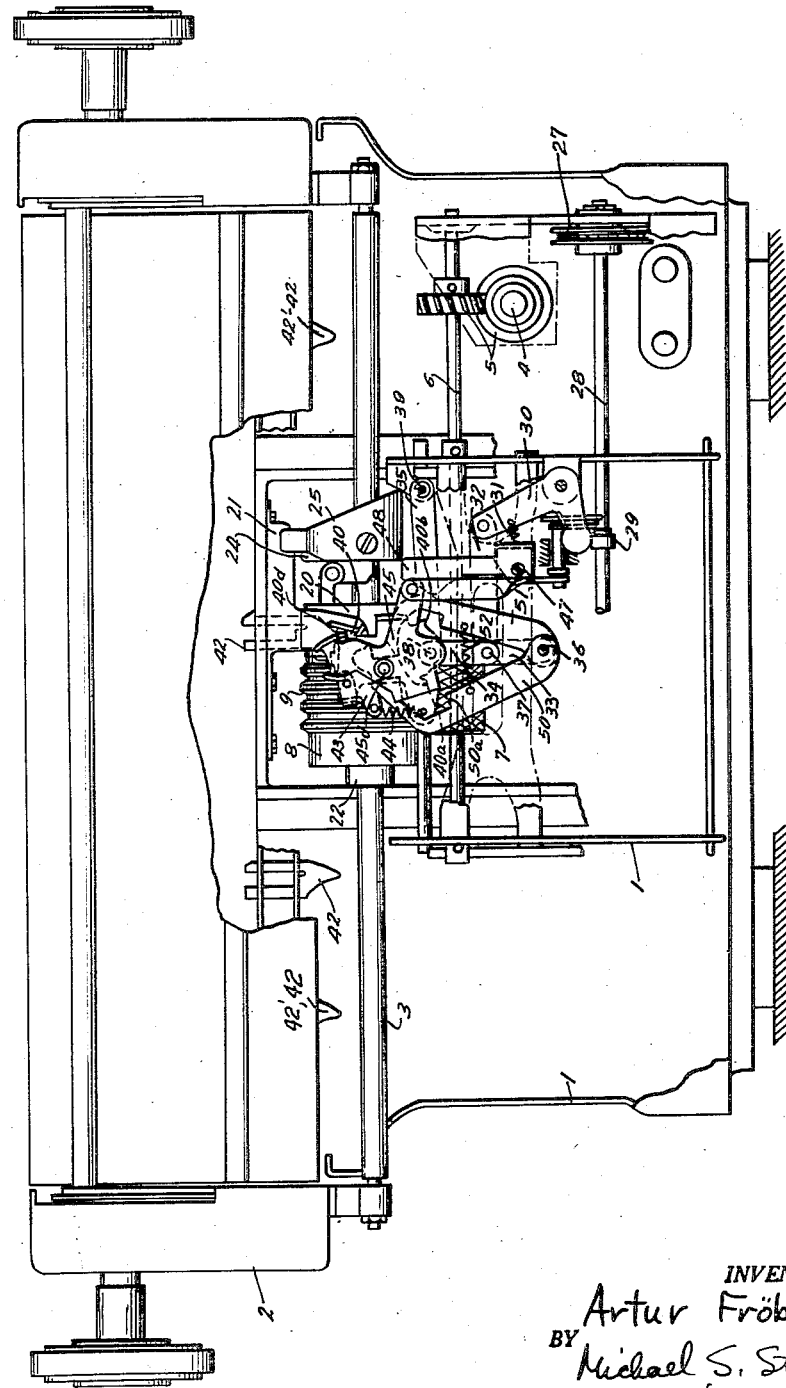
Fig. 1 is a rear view of an accounting machine provided with a carriage drive according to a preferred embodiment of the present invention, the rear wall of the machine being omitted for the sake of clarity.

Referring now to the drawings, and more particularly to Fig. 1, a machine frame 1 and a carriage 2 of an accounting machine are shown in this figure. The carriage 2 is reciprocated between its terminal positions, and is stopped at desired points during its travel in one direction by the carriage drive means according to the present invention. A shaft means 3 is turnably mounted in the carriage 2, and consequently participates in the reciprocating movement of the carriage 2.

Figure 3:
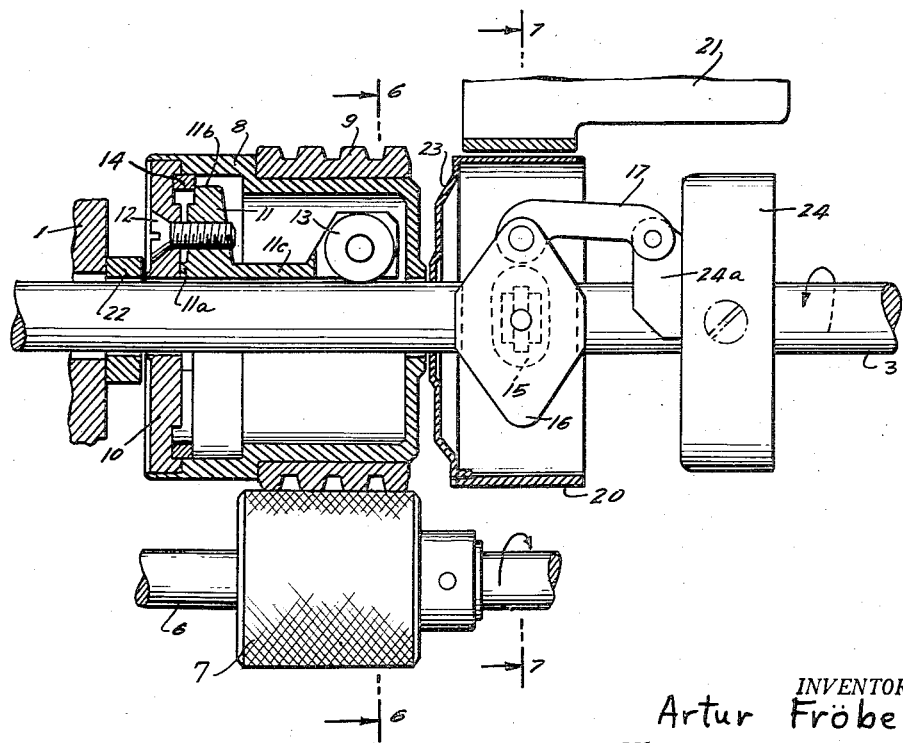
Fig. 3 is a fragmentary sectional view of a detail showing coupling means and carriage transporting means in one operational position.
Figure 4:
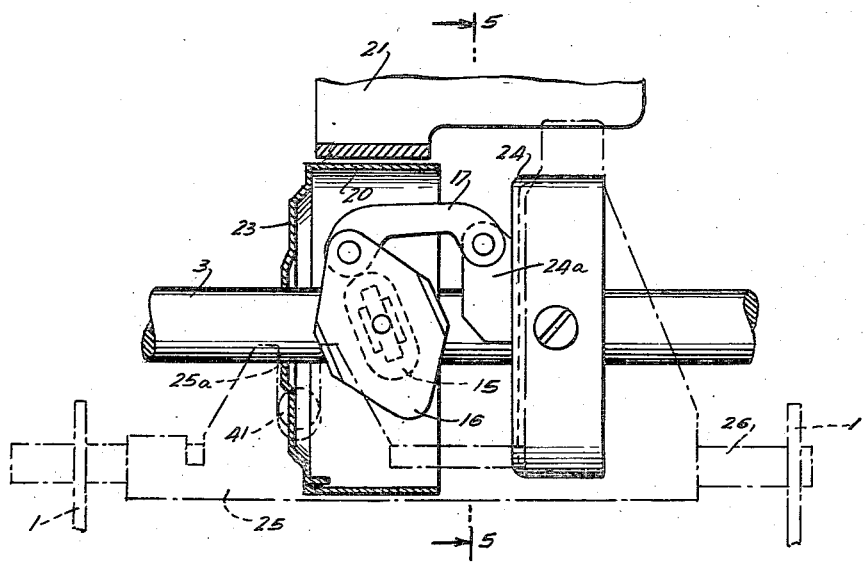
Fig. 4 is a rear view of a detail showing the carriage transporting means in another position.

The carriage transporting means according to the present invention cooperates with the shaft means 3, and will be best understood with reference to Figs. 3, 4, 5 and 7. Three transporting rollers 15 are provided which preferably have rims of a resilient material, and are in rolling engagement with the shaft means 3. Each transporting roller 15 is turnably mounted in a support 16, as best seen in Fig. 7. Each support 16 has a central pin 16a which passes through a corresponding bore in a tension ring member 20. The extension 16a is stepped, and carries on its wider inner part, a plate 19 which is secured thereto by a split ring 19a. The thinner end portion of the pin 16a is held on the ring 20 by a similar split ring 19b. Due to the fact that the ring member 20 is resilient, and is somewhat forced upon the shaft means 3, the transporting rollers 15 engage the shaft means 3 at a selected contact pressure. Consequently, the roller means 15 will turn in supports 16 when the shaft means 3 is rotated, and on the other hand, rotation of the roller means 15 will cause rotation of the shaft means 3. Fig. 7 shows the transporting rollers 15 in a neutral position in which their axes extend parallel to the axis of shaft means 3. Each plate 19, and the respective opposite face of the respective support 16, is provided with circular grooves in which balls 18 may roll. Consequently each support 16 can turn with the associated transporting roller means 15 about an axis which is transverse, or more specifically radial, to the axis of the shaft means 3, and which is transverse to the axis of the respective transporting roller means 15. Fig. 3 shows one of the transporting rollers 15 in broken lines, and in its neutral position. Fig. 4 shows one of the transporting rollers 15 in an inclined position in which the support 16 has been turned in counterclockwise direction as viewed in Fig. 4. It will be understood that it is also possible to turn the transporting rollers 15 out of the neutral position into an inclined position in which they are inclined in a direction opposite to the direction of inclination shown in Fig. 4.

Figure 5:
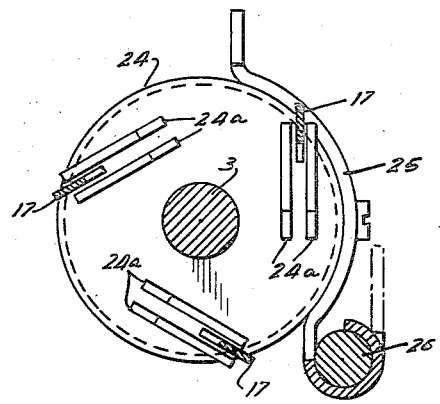
Fig. 5 is a cross-sectional view taken on line 5—5 in Fig. 4.

Operating means are provided for moving the supports 16 between the inclined transporting positions, and the neutral position. Each support 16 is provided with a pair of lugs 16b through which a pin 16c passes. As best seen in Figs. 4 and 7, a link 17 is articulated on each pin 16c, and is pivotally connected at its other end to a pair of lugs 24a, best seen in Figs. 4 and 5. The lugs 24a are fixed on a cup-shaped control ring 24, which is mounted on the frame of the machine movable in direction of the shaft means 3. The control ring 24 is fixedly connected to a control bracket 25 shown in solid lines in Fig. 2, and in broken lines in Fig. 4. As best seen in Fig. 5, the control bracket has a curved portion secured to the ring-shaped member 24, and a lower portion which embraces a guide rod 26 along which the control bracket 25 can be shifted. The control bracket 25 has an extension formed with a slot 25a into which a pin 41 projects, as shown in dash and dot lines in Fig. 2. This pin 41 will be described hereinafter in greater detail, but it will be understood that shifting of pin 41 in axial direction of shaft means 3 will result in shifting of the control bracket 25, in shifting of the ring member 24, and finally in shifting of the three supports 16 with their associated transporting roller means 15. In accordance with the position of the pin 41 and of the control bracket 25, the transporting roller means will be in the oblique position shown in Fig. 4, in the neutral position shown in Fig. 3, or in another inclined position turned beyond the neutral position.

Figure 2:
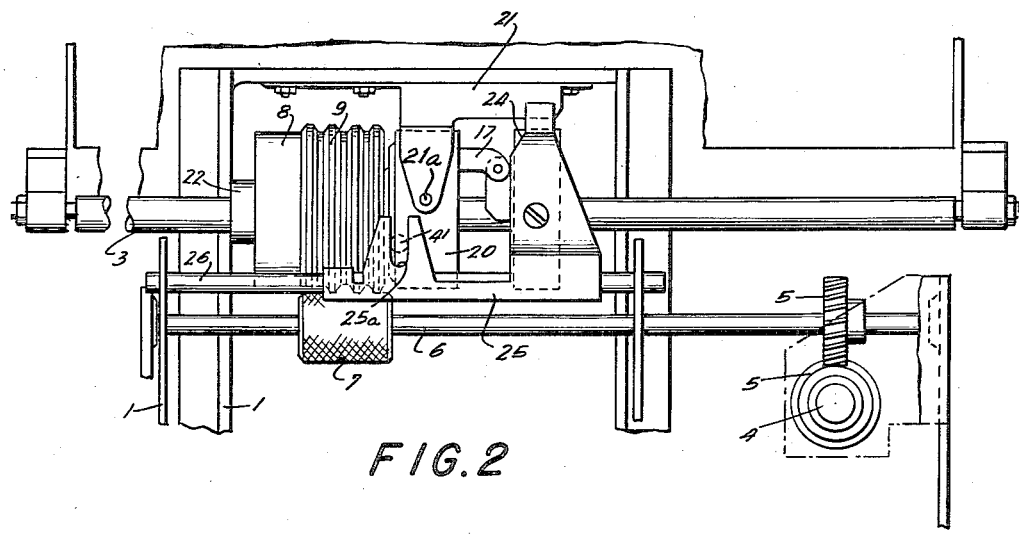
Fig. 2 is a fragmentary rear view of a detail of the embodiment illustrated in Fig 1.

The tension ring 20 is rigidly connected to the machine frame 1 by means of a holder 21 and pins 21a, as shown in Fig. 2. Due to the resilient construction of the ring 20, all transporting rollers 15 are uniformly pressed against the surface of the shaft means 3. The spring tension of the ring 20 is so selected as to prevent slipping between the peripheries of the transporting roller 15 and the shaft means 3.

From the above description it will be apparent that in accordance with the present invention reciprocation of the carriage can be obtained in three different ways.

(1) When the transporting roller means in any one of their inclined transporting positions are driven to rotate about their respective axes, they will tend to roll along a helical path about the shaft means 3. When the ring 20 is stationarily held in the frame 1, the shaft means 3 will turn, and simultaneously move in one axial direction. When the transporting roller means are moved to the neutral position shown in Fig. 3 by the operating means, the shaft means will continue to rotate, but will not perform an axial movement. When the transporting roller means are turned in the opposite inclined transporting position, the shaft means 3 will rotate and simultaneously move in opposite direction.

(2) It is also possible to rotate the ring 20 together with the supports 16 and the transporting rollers 15. While this arrangement is not shown in the drawings of the present application, it will be understood that rotation of the ring 20 will also produce a rolling of the transporting rollers on the shaft means 3, and when the ring 20 is prevented from movement in axial direction of shaft means 3, shaft means 3 will be forced to move in axial directions thereof, depending on the inclined position of the transporting roller means 15. Of course if the transporting roller means are in neutral position, rotation of the ring 20 will not result in axial movement of the shaft means 3.

(3) In accordance with the illustrated embodiment of of the present invention the shaft means 3 is rotated by drive means, as will be described hereinafter in greater detail, and consequently forces, due to frictional engagement, the transporting roller means 15 to rotate. The ring 20 is held stationarily in the frame of the machine, and consequently can neither rotate nor move in axial direction. This arrangement is the opposite of the arrangement described at (1) and consequently shaft means 3 will be forced to move in axial direction, the direction of such movement depending on the inclined position of the transporting roller means 15. When the transporting roller means 15 are in the neutral position shown in Fig. 3, rotation of the shaft means 3 will not effect a movement thereof in axial direction. During continuous rotation of the shaft means 3 in one direction of rotation, the shaft means 3, and therewith the carriage 2 will travel in one direction when the transporting roller means 15 are in the inclined transporting positions shown in Fig. 4, and will travel in the opposite direction when the transporting roller means 15 are inclined in opposite directions.

Consequently, by shifting the control bracket 25, and the control ring 24 together with the links 17, reversal of the carriage movement can be obtained. Furthermore, the carriage can be stopped in any intermediate position by moving the transporting roller means 15 to neutral position. It will be noted that such stopping will take place very gradually, since the driving force is gradually reduced as the transporting roller means 15 move from their maximum inclined transporting position to neutral position.

The shaft means 3 is driven by an electric motor which is mounted in the machine frame 1 and which rotates continuously in the same direction. No reversal of the drive motor is necessary since the reversal of the carriage movement is obtained by the transporting roller means 15. The drive motor drives through a motor shaft 4 and a worm-gearing 5 an intermediate shaft 6 which is journalled in the machine frame 1 and extends parallel to shaft means 3 in the rear part of the machine frame 1. A friction roller or drum 7 is mounted on the intermediate shaft 6, and has on the surface thereof crossing inclined grooves for increasing the friction. As best seen in Fig. 3, the shaft means 3 is surrounded by a coupling casing 8 on which is fixed a sleeve 9 consisting of a resilient flexible material having a high coefficient of friction, for example rubber or another suitable elastomeric material. The sleeve 9 is provided on its surface with peripheral annular grooves separated by annular ridges which are in frictional engagement with a surface of roller 7. The ridges can laterally yield into the grooves of the sleeve 9 under the contact pressure between the surfaces of the sleeve 9 and the roller 7. The coupling casing 8 includes a closure plate 10 which is connected by a force fit with the drum portion of the casing 8, and consequently rotates with the coupling casing. Three resilient support members 11, only one of which is shown in Fig. 3, are fixed to the plate 10 by screws 12. The free end of each supporting member 11 is bifurcated. A pair of pins 13a is screwed into each prong of each supporting member 11, and between the pointed ends of the pins 13a, a coupling roller 13 is mounted for rotation. As clearly shown in Fig. 6, each coupling roller is in frictional engagement with the shaft means 3, and the axis of rotation of each coupling roller 13 is perpendicular to the axis of shaft means 3. The supporting members 11 are angularly spaced 120°, so that the forces are uniformly distributed. Upon rotation of the friction drum 7 in counterclockwise direction, the coupling casing 8 and the supporting members 11 with the coupling roller 13 will rotate in clockwise direction and drive shaft means 3 in the direction of the arrow in Fig. 6. Such rotation of the shaft means 3 will result in axial movement of the shaft means 3 if the transporting rollers 15 are in one of the two inclined transporting positions thereof. Axial movement of the shaft means 3 is in no way obstructed by the coupling means 8, 11, 13, since the coupling rollers 13 roll on the shaft means 3 when the same moves in axial direction thereof.

Each supporting member has a projection 11a which abuts against the closure plate 10, and a projection 11b which abuts against an adjusting ring 14 mounted between the plate 10 and the supporting member 11. The intermediate portion 11c of each supporting member 11 is resilient. The contact pressure between the coupling rollers 13 and the surface of shaft means 3 is determined by the thickness of the adjusting ring 14. If it is desired to increase the contact pressure between the coupling rollers 13 and the shaft means 3, an adjusting means 14 of greater thickness can be inserted whereby the projections 11b of the supporting members 11 are held at a greater distance from the plate 10 so that the resilient portions 11c of the supporting members 11 are bent to a greater extent. Thereby the resilient pressure of the coupling rollers 13 on the shaft means 3 is increased. The three supporting members 11 constitute together a supporting means for the coupling roller means 13 which can be adjusted by the adjusting means 14.

Between the plate 10 of the coupling means and the machine frame 1 is arranged a bearing ring 22. Another bearing plate 23 is arranged between the other end plate of the coupling casing and the tension ring 20 so that axial pressure produced by the carriage transporting means is taken up by the frame 1.

The same electric motor which drives the shaft means 3, also drives through a chain drive 27, a cam shaft 28 which is mounted in the machine frame 1. A cam 29 is fixedly mounted on the end of cam shaft 28, and cooperates with a cam follower lever 30, which is of bell-crank shape. The bell-crank lever 30 is mounted in the machine frame and is actuated by the cam 29 to turn in clockwise direction out of its initial position which is illustrated in Fig. 1, into the position illustrated in Figs. 8 and 9. A spring 31 is connected to the bell-crank lever 30 and tends to turn the lever to its initial position and against the receding portion of the cam track of cam 29. The upper arm of the bell crank cam follower lever 30 is articulated to a connecting rod 32. The connecting rod 32 is part of a linkage system which includes a link 35 and a pair of toggle levers 33 and 34. The toggle levers 33 and 34 are connected by a pin 37 to the connecting rod 32. The free end of toggle lever 33 is pivotally mounted on a pin 36 which is fixed in the frame of the machine. The free end of the toggle lever 34 is connected by a pin 38 to the end of the link 35, and also to a control lever 40. The other end of link 35 is pivotally mounted on a pin 39 which is supported in a bracket fixed to the machine frame.

Figure 8:
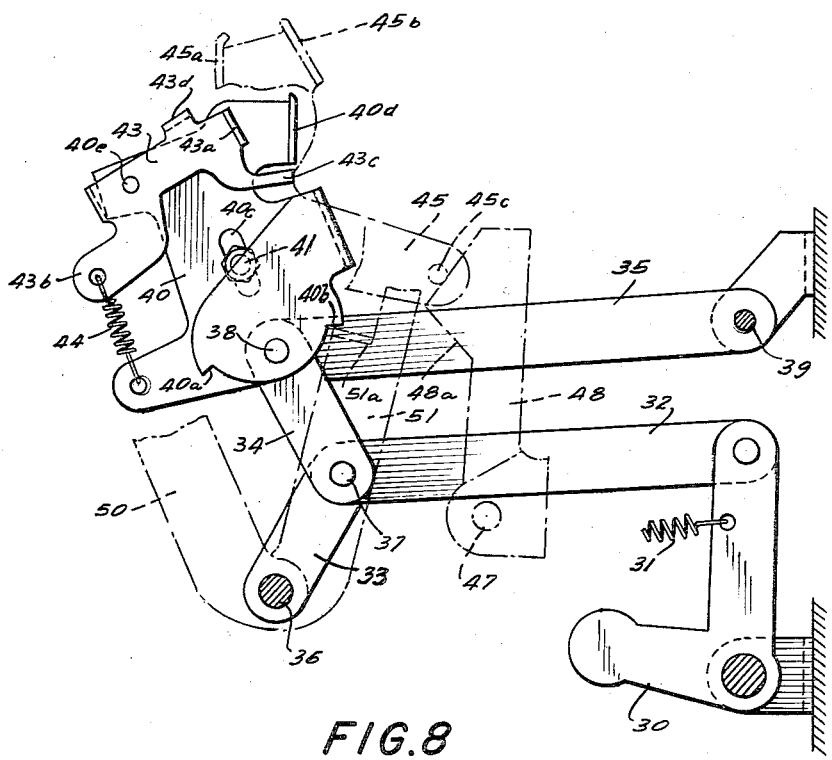
Fig. 8 is a fragmentary rear view illustrating the control means according to the present invention in solid lines, and showing part of the reversing means in dash and dot lines.

When the drive motor of the machine turns the cam shaft 28 through the chain drive 27, the cam 29 operates the cam follower 30 so that the pair of toggle levers 33, 34 moves between the straightened position shown in Fig. 1, and the position shown in Figs. 8 and 9. The pin 38 moves during the operation of the linkage system along a circle whose center is in the axis of pin 39. Since the link 35 is comparatively long, the path of movement of the pin 38 is almost straight and vertical. Since the control lever 40 is connected to the pin 38, the control lever 40 will move up and down when the cam 29 actuates the cam follower 30. While the projecting cam track portions of cam 29 engage the bell-crank lever 30, the toggle levers 33, 34 will move the control lever 40 to a lower position shown in Figs. 8 and 9, whereas engagement between the receding portions of the cam 29 and the bell crank lever 30 will result in raising of the control lever 40 to a raised position shown in Fig. 1.

The control lever 40 has, as best seen in Figs. 8 and 9, a forwardly bent portion which has two shoulders 40a and 40b. The shoulders 40a and 40b are located on opposite sides of the pin 38. The main portion of the control lever 40 is somewhat behind the shoulders, and has a slot 40c into which an adjustable pin 41 projects. Pin 41 is also shown in Fig. 2 from which it becomes apparent that pin 41 projects into the slot 25a of the member 25. Consequently, shifting of the pin 41 in direction of the rod 26 will result in shifting of the operating means 24, 17, and in corresponding shifting of the carriage transporting means including the transporting rollers 15.

Since the slot 25a extends in substantially vertical direction, a vertical movement of the pin 41, as will be obtained by the operation of the toggle levers 33, 34, will have no influence on the operating means and on the carriage transporting means. When, however, the pin 41 moves in direction of the shaft 26, that is in horizontal direction, the shifting of the carriage transporting means will take place. Such movement of the pin 41 in horizontal direction is obtained by turning the control lever 40 about the pin 38. When the control lever 40 is in a central neutral position, the carriage transporting means and particularly the transporting rollers 15, are also in neutral position in which the axis of the roller 15 is parallel to the shaft means 3 so that the shaft means 3 is not moved in axial direction. When the control lever 40 turns out of the central neutral position, the pin 41 moves along an arc about pin 38 and causes the operating means 25, 24 to follow its movement to the left, or to the right, so that the transporting rollers are turned out of the neutral position into one or the other transporting position in which the axes of the transporting rollers are inclined to the axis of the shaft means 3 as previously described. The extent of inclination of the transporting rollers 15 can be determined by adjusting the pin 41 in the slot 40c. The pin 41 is threaded, and provided with a nut so as to be fixed in different positions in the slot 40c. When the pin 41 is in an outer position in the slot 40c, turning of the control lever 40 about a given angle will result in shifting of the operating means 25, 24 through a greater distance and in a more inclined transporting position of the transporting roller 15. On the other hand if the pin 41 is secured to the inner end of slot 40c, then the same angular movement of the control lever 40 will result in turning of the transporting rollers 15 through a smaller angle so that the shaft means 3 is less rapidly moved in axial direction. Therefore, the speed of the shaft means 3, and of the carriage connected thereto, can be adjusted by varying the position of the pin 41 in the slot 40c.

The control lever 40 has a projection 40d which is forwardly bent as best seen in Fig. 8. The projection 40d cooperates with tabulator stops 42 which are attached to the carriage 2 as best seen in Fig. 1. A latch member 43 is pivotally mounted on the control lever 40 by means of a pin 40e.

The latch member 43 has a forwardly projecting portion 43a which cooperates with the tabulator stops 42. A spring 44 is attached to an arm 43b of the latch member 43, and is connected at its other end to the control lever 40. The spring 44 tends to turn the latch member 43 in counterclockwise direction until the finger 43c abuts from below against the projection 40d on the control lever 40. When the latch member 43 is turned in clockwise direction, a rearwardly bent projection 43d abuts against the upper edge of the control lever 40 and limits such turning movement of the latch member.

A reversing lever 45 is arranged adjacent the control lever 40. The reversing lever 45 is shown in solid lines in Fig. 1, and is shown in dash and dot lines in Figs. 8 and 9. The reversing lever 45 is mounted on a pin 46 which is supported on the machine frame 1, and can turn about pivot pin 46. The top portion of the reversing lever 5 has two bent projections 45a and 45b which cooperate with two terminal stops 42' shown in Fig. 1. The dimensions of the terminal stops correspond to the dimensions of the tabulator stops 42, but the terminal stops are mounted, respectively, at the ends of the carriage 2 in the vertical plane of the projections 45a and 45b on the reversing lever 45, whereas the tabulator stops 42 are located in a parallel vertical plane in which also the projections 40d and 43a are located. Tabulator stops 42 are not only provided on the carriage intermediate the terminal stops 42', but a tabulator stop 42 is arranged on the carriage behind each terminal stop 42'.

A pin 45c is secured to the arm 145 of the reversing lever 45 which points to the right in Fig. 9 and is shown in Fig. 9 in solid lines for the sake of clarity.

The reversing lever 45 is turnable about pin 46 between two reversing positions. A detent lever 48 is provided for holding the reversing lever 45 in its two shifted reversing positions. The detent lever 48 is pivotally mounted on the machine frame on a pivot pin 47 and is urged to turn in counterclockwise direction by a coil spring 49 which is wound around the pivot pin 47. The detent lever 48 has a projection 48a which cooperates with a pin 45c on the reversing lever 45. In one reversing position of the reversing lever 45, the pin 45c engages the inclined face 148 of the detent lever projection 48a, and in the other reversing position of the reversing lever 45, the pin 45c engages the other inclined face 248 of the projection 48a. These two positions of the reversing lever 45 are shown in Figs. 9 and 8, respectively.

A pin 45d is fixedly secured to the reversing lever 45 at a point located above the pivot pin 46. This pin 45d projects in rearward direction and is located between two end portions 150 and 151 of the two arms 50 and 51 of a shifting means. The shifting arm 50 has an abutment 50a, and the shifting arm 51 has an abutment 51a. The abutments 50a and 51a, respectively, cooperate with the shoulders 40a and 40b of the control lever 40. A spring 52 connects the two shifting arms 50 and 51, and urges the same to turn about the pin 36 and into engagement with the pin 45d.

When the reversing lever 45 is turned on pin 46 to move from one reversing position to the other reversing position, the pin 45d turns the shifting means 50, 51 about the pin 36. In the position shown in Fig. 1, the shoulder 40b is located directly above the abutment 51a. It will be noted that in the position of Fig. 1, the toggle levers 33 and 34 are in straightened positions. Consequently movement of the toggle levers 33, 34 to the position shown in Fig. 8 will result in lowering of the control lever 40 into a position in which the shoulder 40b engages the abutment 51a as shown in Fig. 8. Such engagement will cause turning of the control lever in counterclockwise direction. Of course, if the shifting means 50, 51 is shifted by the reversing lever 45 into its other position, the shoulder 40a will be located above the abutment 50a when the toggle levers 33, 34 are in straightened positions so that operation of the toggle levers will result in engagement between the shoulder 40a and the abutment 50a and in turning of the control lever 40 in clockwise direction.

Turning of the control lever 40a out of its neutral position in one or the other direction will result in shifting of the operating means 25, 24 due to the action of pin 41, and in shifting of the carriage transporting means between the two transporting positions in which the carriage is transported to the left, or to the right, respectively, in Fig. 1.

The shifting of the reversing means 45, 45d, 50, 51 is effected in the end positions of the carriage 2 by the terminal stops 42' by engagement between the terminal stops and the projections 45a, 45b of the reversing lever 45.

As previously described, the projections 43a and 40d of the latch member 43 and of the control lever 40 cooperate with the tabulator stop means 42 during movement of the carriage if the toggle levers 33, 34 are in the straightened position shown in Fig. 1. If the toggle levers are in the position shown in Fig. 9, the control lever 40 is lowered, and consequently the projections 40d and 43a are located out of the path of the tabulator stops 42. It is frequently desired to have the tabulator stops 42 only operative during movement of the carriage in one direction, whereas stopping of the carriage in tabulator positions is not desired during the return movement of the carriage. For this purpose, in accordance with the present invention, a mechanism is provided for locking the cam follower lever 30 in its operative position shown in Fig. 9 so that the control lever 40 and the projections 40d and 43a are held spaced from the path of movement of the tabulator stops 42 during the return movement of the carriage 2.

As shown in Figs. 9 and 10, a connecting rod 53 is pivotally connected to the arm 145 of the reversing lever 45 by means of the pivot pin 45c. When the reversing lever is turned to one of its reversing positions, the connecting rod 53 turns a shaft 55 through a lever 54 as best seen in Fig. 10. The other end of shaft 55 has fixed thereon a lever 56 which shifts a link 57 in horizontal direction upon turning of shaft 55. Link 57 has a slot 57a which is engaged by a pin 58a of a locking member 58. A pin 158 supports the locking member 58 for turning movement between a locking position in which the shoulder 58b engages a locking projection 30a on the cam follower 30, and a releasing position in which the locking shoulder 58b releases the locking projection 30a. A spring 59 is connected to one end of the locking member 58 and tends to turn the same about pin 158 into engagement with the locking projection 30a. Assuming that the cam follower lever 30 is turned in clockwise direction by cam 29 while the reversing lever 45 has turned to the right in Fig. 9, then the locking member 58 has its shoulder 58b under the projection 30a of the cam follower lever 30 because the pin 58a of the locking member 58 can move in the slots 57a in the link 57 as shown in Fig. 10. Consequently, the cam follower lever is held in the position shown in Fig. 9 in which the control lever 40 is lowered so that the tabulator stop means 42 are inoperative. When the reversing lever 45 is turned to the left, then the connecting rod 53 moves upwardly, and the link 57 is shifted to the right in Fig. 10 by members 54 and 56, and the locking member 58 is turned in counterclockwise direction against the action of spring 59 so that its locking shoulder 58b releases the locking projection 30a on cam follower lever 30 permitting the cam follower lever 30 to turn in counterclockwise direction in Fig. 9 to follow the cam track of cam 29 under the action of a spring 31. Such counterclockwise turning of the cam follower lever 30 will result in straightening of the toggle levers 33, 34 for moving the control lever 40 into its raised position in which the tabulator stops 42 are operative by engaging the projections 40d and 43a.

The above described apparatus according to the present invention operates in the following manner:

It is assumed that at the beginning of an operation, the carriage 2 is in the position illustrated in Fig. 1. After a value has been set by means of a keyboard, the electric motor is started, for example by means of an operating key, and the input value, or an accounting sign is printed on the sheet of paper held on the platen of the carriage. The electric motor which actuates the printing mechanism and the totalizer of the machine, drives at the same time through the motor shaft 4, the worm gear 5, the intermediate shaft 6, and the friction roller 7, the coupling means 8—14, so that the coupling rollers 13 effect rotation of the shaft means 3.

Reciprocation of the carriage 2, and axial movement of the shaft means 3 does not yet take place because the control lever 40, and consequently the operating means 25 and 24 and the transporting rollers 15 are in their respective central neutral positions.

At the same time, the electric motor drives through the chain drive 27 the cam shaft 28 with cam 29. The cam track of cam 29 is so designed that during the time in which a printing operation is carried out by the machine, the cam follower lever 30 moves along a circular cam track portion and is not displaced by cam 29.

Directly after the printing operation, however, a raised cam track portion of cam 29 engages the cam follower lever 30, and consequently the cam follower lever 30 turns in clockwise direction from the position illustrated in Fig. 1 into the position illustrated in Fig. 8. Such actuation of the cam follower 30 by the actuating means 28, 29 results in shifting of the linkage system 32, 33, 34, and in movement of the control lever 40 from its higher position to its lower position shown in Fig. 8. As previously described the pivot pin 38 which supports the control lever 40 moves downwardly when the toggle levers 33, 34 move out of the straightened position shown in Fig. 1 into the partly folded position shown in Figs. 8 and 9. The shoulder 40b moves from the position shown in Fig. 1 into the position shown in Fig. 8 and engages the abutment 51a of the shifting arm 51 during this part of the downward movement of the control lever 40, the projections 40d of the control lever 40 and the projections 43a of the latch member 43 move out of the path of movement of the tabulator stop means 42, and more particularly the projection 40d releases a tabulator stop 42 which is arranged adjacent a terminal stop 42'.

At the end of the downward movement of the control lever 40, and after the shoulder 40b abuts on the abutment 51a, the control lever 40 is forced to turn in counterclockwise direction about the pin 38, since further downward movement of the control lever 40 is only possible on the left side thereof, the right side thereof being arrested by the abutment 51a.

Turning of the control lever 40 results in shifting of the control pin 41 to the left, so that the operating means 25 and 24 are shifted to the left resulting in turning of the transporting rollers 15 through link 17 and supports 16. The transporting rollers are moved out of the neutral position shown in Fig. 3 in which their axes are parallel to the axis of shaft means 3, and assume a transporting position in which their axes are inclined to the axis of shaft means 3.

Rotation of shaft means 3 forces the transporting rollers 15 to turn, so that the transporting rollers have the tendency to roll along the shaft means 3 along a helical path. However, since the transporting rollers, and their supports 16 are mounted in the ring 20 which is fixed to the frame of the machine, the transporting rollers cannot move in axial direction of the shaft means 3, and consequently the shaft means 3 is forced to move in axial direction thereof, the direction of movement, and the speed of shaft means 3 depending on the annular positions of the transporting rollers 15. Since the last stop means 42 was released by the downward movement of members 40, 38, 33 and 34, the carriage 2 can move with the shaft means 3.

It will be understood that regardless of the direction of carriage movement, the shaft 3 always turns in the same direction. The direction of rotation of the shaft 3 is selected in such a manner that the carriage 2 moves in a direction opposite to the shifting direction of the control lever 40, in other words, the carriage must move to the right when the control lever is set to the left, and vice versa.

It will be understood that a reciprocating movement of the carriage could also be obtained by mounting the supports 16 and the rollers 15 on the carriage 2 and by driving the same by a shaft 3 which is mounted in the frame of the machine. It is, however, preferred to mount the shaft means 3 on the carriage, since the mass of the shaft means 3 is substantially smaller than the mass of the members 20, 16 and 15. Due to this arrangement the greater masses are mounted on the stationary frame, and the smaller masses are mounted on the carriage so that the carriage can easily be accelerated and decelerated. Moreover, the illustrated embodiment permits increase of the working speed and reduction of the noise of the machine.

Directly after the angular displacement of the control lever 40, and the start of movement of the carriage 2, the cam follower 30 engages a receding portion of the cam track of cam 29 so that the spring 31 turns the bell crank lever 30 in counterclockwise direction to its initial position shown in Fig. 1. Thereby, the toggle levers 33 and 34 are moved to the straightened position shown in Fig. 1, and the control lever 40 is moved in upward direction while still being in a position turned to the left as viewed in Fig. 8. Consequently the projection 40d on the control lever 40, and the projection 43a on the latch member 43 are returned into the path of movement of the tabulator stops 42, without having any effect on the movement of the carriage.

The tabulator stops 42 are now moving to the right in Fig. 1 together with the carriage 2 until a stop 42 strikes against the projection 43a on the latch member 43 and turns the same in clockwise direction as viewed in Fig. 8. The respective tabulator stop 42 passes the projection 43a and engages the projection 40d of the control lever 40. The latch member 43 turns back in counterclockwise direction under the action of spring 44 so that the respective tabulator stop 42 lies between the projection 43a and the projection 40d. During further movement of the respective tabulator stop 42 with the carriage 2, the control lever 40 is turned since the moving tabulator stop acts on the projection 40d. When the control lever 40 turns in clockwise direction, the pin 41 moves to the right, and shifts the operating means 25 and 24, and thereby the carriage transporting means 15 and 16 into neutral position in which the axes of the transporting rollers 15 are parallel to the axis of shaft 3 so that no movement of the carriage can take place.

Since the transporting rollers 15 gradually turn to the central neutral position, the carriage comes to a gradual and smooth stop. In the event that the carriage 2 passes beyond its stopping position as a result of external influence, then the control lever 40 is turned by the respective tabulator stop 42 beyond its central neutral position into an opposite control position. As a result, the carriage transporting means 15 and 16 will be turned to the other transporting position in which the shaft 3 and the carriage 2 are moved in opposite directions to the left until the respective tabulator stop 42 returns the control lever 40 to neutral position by acting on the projection 43a of the latch member 43. As a result of the positive operational connection between the control lever 40 with its latch member 43 and the respective tabulator stop, the carriage 2 is always stopped in a precise position in which the respective tabulator stop 42 is located between the projections 43a and 40d.

Thus, the carriage 2 has been stopped by a tabulator stop 42 in a selected intermediate position during movement in one direction, and when it is desired to move the carriage 2 to the next entry column the operation is repeated, and the carriage is stopped in a plurality of carriage positions corresponding to columns. The positions of the tabulator stop 42 may be adjusted in a known manner to provide different spacing of the entry columns.

Means may be provided for turning the control lever 40 by manual operation for starting and stopping carriage movement as desired.

In the end positions of the carriage 2, the carriage movement is reversed by the terminal stops 42'. When the carriage 2 moves further to the right and approaches the end position, the stop means 42 which is adjacent the terminal stop 42' engages the projections 43a and 40d as above described, and turns the control lever 40 to its central neutral position so that the carriage transporting rollers 15 are also turned to neutral position. At the same time, the left-hand terminal stop 42' engages the projection 45a of the reversing lever 45 and turns the reversing lever in clockwise direction into the reversing position shown in Fig. 9 in which the reversing lever 45 is arrested by the arresting means 48 by engagement between the inclined face 148 and the pin 45c. During turning movement of the reversing lever 45, the pin 45d turns the shifting means 50 and 51 so that the abutment 50a is moved to a position in which it is located below the shoulder 40a, while the abutment 51a is now outside of the path of movement of the shoulder 40b. The carriage 2 has now been stopped in its end position, while the reversing lever 45 is shifted.

During the following operation, the cam follower lever 30 is again turned in clockwise direction by the cam 29 so that the control lever 40 moves downwardly. The control lever 40 first releases the left-hand stop 42 which was engaged by projection 40d, and then strikes with its left-hand shoulder 40a the abutment 50a of the shifting arm 50 whereby the control lever 40 is turned to the right as shown in Fig. 9. Consequently, the transporting rollers 15 are turned into the other inclined transporting position with respect to shaft 3 so that the carriage 2 starts a return movement to the left. During the downward movement of the control lever 40, the projection 43a of the latch member 43 has moved out of the path of stop 42.

In the event that it is desired to stop the carriage movement during the carriage return, latch members corresponding to the latch member 43 but being arranged in a mirror symmetrical arrangement would have to be provided on the right side of the projection 40d of the control lever 40. If such second latch member 43 were provided, the tabulator stop would be effective during the return movement of the carriage whenever the cam 29 would effect movement of the control lever 40 to raised position.

In the illustrated preferred embodiment of the present invention it is not desired to stop the carriage 2 during its return movement to the left as viewed in Fig. 1. Consequently, it must be avoided that the control lever 40 is moved to its raised position during the return movement of the carriage. From the above description of the structure and operation of the machine, it will be evident that the control lever 40 is located outwardly of the path of movement of the tabulator stop 42 as long as the cam follower lever is in the position illustrated in Fig. 9. Therefore, the cam follower lever 30 must be held in this position during the entire return movement of the carriage 2 although the spring 31 tends to move the cam follower lever 30 out of this position.

The locking member 58 which is inoperative when the reversing lever 45 is turned to the left, moves under the action of spring 59 to a locking position when the reversing lever 45 turns to the right. Such movement into locking position is possible since the linkage means 53, 54, 55, 56, 57, 57a release the locking member 58 when the reversing lever turns to the right as shown in Figs. 9 and 10. When the cam follower lever 30 is turned in clockwise direction by the cam 29, the projection 58b on the locking member 58 comes under the projection 30a on the cam follower lever 30 and holds the same in the position shown in Fig. 9 in which the control lever is held in a position spaced from the path of the tabulator stops 42. All the tabulator stops 42 pass the control lever 40 during the return movement of the carriage without having any effect on the same.

When the carriage 2 moves to the other end position without having been stopped by the tabulator stop 42, the right-hand terminal stop 42' engages the reversing projection 45b of the reversing lever 45 and turns the same to the left. At the same time, the pin 45c of the reversing lever 45 withdraws through members 53—57, the locking member 58 so that the shoulder 58b releases the projection 30a permitting return of the cam follower lever 30 in counterclockwise direction under the action of the spring 31. Thereby the toggle levers 33, 34 are straightened and move the control lever in upward direction until the projections 40d and 43a are again at the height of the tabulator stops 42. The right-hand tabulator stop 42 which is directly adjacent the respective terminal stop 42', as previously described, comes to lie between the projection 43a on the latch member 43 and the projection 40d on the control lever 40. Consequently, the respective tabulator stop 42 which moves with carriage 2 to the left, returns the control lever 40 to its central neutral position. The carriage 2 is now in its initial position in which the reversing lever 45, and the shifting means 50 and 51 are turned to the left. Consequently a further operation would move the control lever 40 to the left, and cause movement of the carriage toward the right.

It will be noted that the carriage is stopped in its end position, as well as in intermediate position by means which do not require a mechanical or electrical stopping or reversing of the machine drive. This is particularly valuable in machines in which the drive means have to rotate without interruption in view of the fact that other elements of the machine are driven by the same drive means, for example by the same electric motor. Since the transporting roller means 15 turn gradually from neutral position into any of the two transporting positions, and also turn gradually from any of the transporting positions to the neutral position, the carriage movement is stopped or reversed in absolutely smooth operation. By varying the angle between the axes of the transporting rollers 15 and the axis of shaft 3, any desired transmission ratio between the drive and the carriage can be established, and consequently the speed of the carriage can be regulated as desired. No reduction gear is required even if small, high speed electric motors are used for driving the machine. If the apparatus of the present invention is used in a typewriter, the stops on the carriage may be constructed in the form of a rack, the pitch of which corresponds to one escapement step. In this case, both the escapement mechanism and the carriage return spring can be omitted.

It is also advantageous to provide a special key on the keyboard which is connected to the reversing lever 45, and upon operation shifts the reversing lever. Thereby, the carriage can be returned from any position to the initial position whenever desired.

It is also contemplated to provide a second locking means which is operated from a key on the keyboard, and that such second locking means include another locking member corresponding to the locking member 58, but being capable of holding the cam follower lever 30 in the position in which the stops on the carriage are inoperative during movement of the carriage in opposite direction. If such a second locking means is provided, it is possible to move the carriage in both directions while the stops are incapable of stopping the carriage in intermediate positions.

Preferably, the cam 29 is mounted on the cam shaft 28 displaceable in axial direction so that the cam 29 may be placed in a position in which it does not engage the cam follower 30 during turning of the cam shaft 28. In this event, the carriage movement is temporarily suspended.

It is also immaterial whether a drive motor runs continuously or is switched off after each operational cycle. In the first case, the bell crank lever 30 can be turned by operation of a key. Thus the apparatus, which is capable of transmitting very powerful setting forces, works very smoothly and silently, while obtaining a very rapid movement of the movable parts.

It will be understood that each of the elements described above, or two or more together, may also find a useful application in other types of carriage drive differing from the types described above.

While the invention has been illustrated and described as embodied in a carriage drive including carriage transporting means having transporting rollers turnable between a plurality of positions in which the axes of the transporting rollers are inclined at different angles with respect to a shaft which is mounted on a carriage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A carriage drive comprising, in combination, a machine frame; a carriage mounted on said frame for movement in one direction; a shaft means having a shaft axis extending in said one direction of movement of said carriage; a carriage transporting means, one of said means being mounted on said carriage and the other of said means being mounted on said frame for turning movement and non-movable in said one direction, said carriage transporting means including at least one support, and at least one transporting roller means engaging said shaft means and being mounted on said support for turning movement about a roller axis, said support and said transporting roller means being turnable about an axis transverse to said roller axis between a neutral position in which said roller axis is parallel to said shaft axis, and at least one transportiong position in which said roller axis is inclined to said shaft axis; drive means for rotating one of said means whereby said carriage is transported in said one direction in said inclined position of said transporting roller means; operating means connected to said support for turning the same about said transverse axis between said neutral and transporting positions; and control means connected to said operating means for actuating the same.

2. A carriage drive comprising, in combination, a machine frame; a carriage mounted on said frame for movement in one direction; a shaft means having a shaft axis extending in said one direction of movement of said carriage; a carriage transporting means, one of said means being mounted on said carriage and the other of said means being mounted on said frame for turning movement and non-movable in said one direction, said carriage transporting means including at least one support, and at least one transporting roller means engaging said shaft means and being mounted on said support for turning movement about a roller axis, said support and said transporting roller means being turnable about an axis transverse to said roller axis between a neutral position in which said roller axis is parallel to said shaft axis, and at least one transporting position in which said roller axis is inclined to said shaft axis; drive means for rotating one of said means whereby said carriage is transported in said one direction in said inclined position of said transporting roller means; operating means connected to said support for turning the same about said transverse axis between said neutral and transporting positions; control means connected to said operating means for actuaing the same, said control means being shiftable between a plurality of control positions; and stop means on said carriage engaging said control means during movement of said carriage for shifting said control means to a control position in which said operating means shift said support to said neutral position for stopping said carriage.

3. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating one of said means whereby said carriage is transported in one direction in one of said inclined transporting positions of said roller means, and is transported in opposite direction in the other inclined transporting position of said transporting roller means; operating means mounted on said frame and connected to said support for turning the same about said transverse axis between said neutral and transporting positions; and control means connected to said operating means for actuating the same.

4. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means, and is transported in opposite direction in the other inclined transporting position of said transporting roller means; operating means mounted on said frame and connected to said support for turning the same about said transverse axis between said neutral and transporting positions; control means connected to said operating means for actuating the same, said control means being shiftable between a plurality of control positions; and stop means on said carriage engaging said control means during movement of said carriage for shifting said control means to a control position in which said operating means hold said support in said neutral position for stopping said carriage.

5. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means, and is transported in opposite direction in the other inclined transporting position of said transporting roller means; operating means mounted on said frame and connected to said support for turning the same about said transverse axis between said neutral and transporting positions; a control lever connected to said operating means for actuating the same, said control lever being shiftable between three control positions for shifting said support and said transporting roller means between said transporting positions and said neutral position; stop means on said carriage; a control linkage including a movable member turnably supporting said control lever for movement between said control positions and being movable together with said control lever between a first position in which said control lever is located in the path of said stop means and engaged by the same during movement of said carriage and a second position in which said control lever is passed by said stop means, said stop means shifting said control lever upon engagement with the same to one of said control positions for shifting said support and said transporting roller means from one of said transporting positions to said neutral position during movement of said carriage in one direction of reciprocation; and actuating means connected to said control linkage for moving said member and said control lever between said first and second positions.

6. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means, and is transported in opposite direction in the other inclined transporting position of said transporting roller means; operating means mounted on said frame and connected to said support for turning the same about said transverse axis between said neutral and transporting positions; a control lever connected to said operating means for actuating the same, said control lever being shiftable between three control positions for shifting said support and said transporting roller means between said transporting positions and said neutral position; stop means on said carriage; a control linkage including a movable member turnably supporting said control lever for movement between said control positions and being movable together with said control lever between a first position in which said control lever is located in the path of said stop means and engaged by the same during movement of said carriage and a second position in which said control lever is passed by said stop means, said stop means shifting said control lever upon engagement with the same to one of said control positions for shifting said support and said transporting roller means from one of said transporting positions to said neutral position during movement of said carriage in one direction of reciprocation, said control linkage including a pair of toggle levers pivotally connected to said member, and a cam follower connected to said pair of toggle levers; and a driven cam shaft mounted in said frame and having a cam cooperating with said cam follower for moving said pair of toggle levers between straightened and angular positions for moving said member and said control lever between said first and second positions.

7. A carriage drive comprising, in combination, a machine frame; a carriage mounted on said frame for movement in one direction; a shaft means having a shaft axis extending in said one direction of movement of said carriage; a carriage transporting means, one of said means being mounted on said carriage and the other of said means being mounted on said frame for turning movement and non-movable in said one direction, said carriage transporting means including at least one support, and at least one transporting roller means engaging said shaft means and being mounted on said support for turning movement about a roller axis, said support and said transporting roller means being turnable about an axis transverse to said roller axis between a neutral position in which said roller axis is parallel to said shaft axis, and at least one transporting position in which said roller axis is inclined to said shaft axis; drive means for rotating one of said means whereby said carriage is transported in said one direction in said inclined position of said transporting roller means; operating means connected to said support for turning the same about said transverse axis between said neutral and transporting positions; a control lever connected to said operating means for actuating the same, said control lever being shiftable between two control positions for shifting said support and said transporting roller means between said transporting position and said neutral position; stop means on said carriage; a control linkage including a movable member turnably supporting said control lever for movement between said control positions and being movable together with said control lever between a first position in which said control lever is located in the path of said stop means and engaged by the same during movement of said carriage and a second position in which said control lever is passed by said stop means, said stop means shifting said control lever upon engagement with the same to one of said control positions for shifting said support and said transporting roller means from said transporting position to said neutral position during movement of said carriage in one direction; and actuating means connected to said control linkage for moving said member and said control lever between said first and second positions.

8. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating one of said means whereby said carriage is transported in one direction in one of said inclined transporting positions of said roller means, and is transported in opposite direction in the other inclined transporting position of said transporting roller means; operating means mounted on said frame, said operating means including an operating member movably mounted on said frame, and at least one link connecting said operating member with said support so that movement of said operating member effects turning of said support and of said transporting roller means between said transporting positions and said neutral position; and control means connected to said operating member for actuating the same.

9. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including a resilient ring surrounding said shaft means, a plurality of supports mounted on said resilient ring uniformly spaced about the inner surface thereof, and a plurality of transporting roller means, each roller means mounted on one of said supports for turning movement about a roller axis, each of said supports being turnable with the associated transporting roller means about an axis extending in radial direction with respect to said shaft axis for turning each of said transporting roller means between a neutral position in which said roller axis is parallel to said shaft axis, and two transporting positions in which said roller axis is inclined in opposite directions to said shaft axis; drive means for rotating one of said means whereby said carriage is transported in one direction in one of said inclined transporting positions of said roller means, and is transported in opposite direction in the other inclined transporting position of said transporting roller means; operating means mounted on said frame and connected to said supports for turning the same about said transverse axis between said neutral and transporting positions; and control means connected to said operating means for actuating the same.

10. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means, and is transported in opposite direction in the other inclined transporting position of said transporting roller means; operating means mounted on said frame, said operating means including an operating member movably mounted on said frame, and at least one link connecting said operating member with said support so that movement of said operating member effects turning of said support and of said transporting roller means between said transporting positions and said neutral position; control means connected to said operating member for actuating the same, said control means being shiftable between three control positions for shifting said operating member from positions of the same in which said transporting roller means is in said transporting positions to a neutral position in which said transporting roller means is in said neutral position; and stop means on said carriage engaging said control means during movement of said carriage for shifting said control means to a control position in which said operating means hold said support in said neutral position for stopping said carriage.

11. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including a resilient ring surrounding said shaft means, a plurality of supports mounted on said resilient ring uniformly spaced about the inner surface thereof, and a plurality of transporting roller means, each roller means mounted on one of said supports for turning movement about a roller axis, each of said supports being turnable with the associated transporting roller means about an axis extending in radial direction with respect to said shaft axis for turning each of said transporting roller means between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means, and is transported in opposite direction in the other inclined transporting position of said transporting roller means; operating means mounted on said frame, said operating means including an operating member movably mounted on said frame, and at least one link connecting said operating member with each support so that movement of said operating member effects turning of said support and of said transporting roller means between said transporting positions and said neutral position; control means connected to said operating member for actuating the same, said control means being shiftable between three control positions for shifting said operating member from positions of the same in which said transporting roller means is in said transporting positions to a neutral position in which said transporting roller means is in said neutral position; and stop means on said carriage engaging said control means during movement of said carriage for shifting said control means to a control position in which said operating means hold said support in said neutral position for stopping said carriage.

12. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including a resilient ring surrounding said shaft means, a plurality of supports mounted on said resilient ring uniformly spaced about the inner surface thereof, and a plurality of transporting roller means, each roller means mounted on one of said supports for turning movement about a roller axis, each of said supports being turnable with the associated transporting roller means about an axis extending in radial direction with respect to said shaft axis for turning each of said transporting roller means between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means, and is transported in opposite direction in the other inclined transporting position of said transporting roller means; operating means mounted on said frame and connected to said supports for turning the same about said transverse axis between said neutral and transporting positions; a control lever connected to said operating means for actuating the same, said control lever being shiftable between three control positions for shifting said supports and said transporting roller means between said transporting positions and said neutral position; stop means on said carriage; a control linkage including a cam follower and a movable member turnably supporting said control lever for movement between said control positions and being movable together with said control lever between a first position in which said control lever is located in the path of said stop means and engaged by the same during movement of said carriage and a second position in which said control lever is passed by said stop means, said stop means shifting said control lever upon engagement with the same to one of said control positions for shifting said supports and said transporting roller means from one of said transporting positions to said neutral position during movement of said carriage in one direction of reciprocation; and actuating means including a cam cooperating with said cam follower for moving said member and said control lever between said first and second positions.

13. A carriage drive comprising, in combination, a machine frame; a carriage mounted on said frame for movement in one direction; a shaft means having a shaft axis extending in said one direction of movement of said carriage; a carriage transporting means, one of said means being mounted on said carriage and the other of said means being mounted on said frame for turning movement and non-movable in said one direction, said carriage transporting means including at least one support, and at least one transporting roller means engaging said shaft means and being mounted on said support for turning movement about a roller axis, said support and said transporting roller means being turnable about an axis transverse to said roller axis between a neutral position in which said roller axis is parallel to said shaft axis, and at least one transporting position in which said roller axis is inclined to said shaft axis; a drive shaft mounted on said frame; a tubular coupling casing surrounding said shaft means and being connected to said drive shaft and driven from the same; a plurality of coupling rollers mounted in said coupling casing and being turnable, respectively, about axes extending transverse to said shaft axis, each of said coupling rollers being in frictional engagement with said shaft means and rolling on the same during axial movement of said shaft means, said coupling rollers turning said shaft means when said coupling casing is turned by said drive shaft; operating means connected to said support for turning the same about said transverse axis between said neutral and transporting positions; and control means connected to said operating means for actuating the same.

14. A carriage drive as set forth in claim 13 and including resilient support means supporting said coupling rollers on said coupling casing; and adjusting means engaging said coupling casing and said resilient support means for simultaneously adjusting the position of said coupling rollers for urging said coupling rollers at a variable contact pressure against said shaft means.

15. A carriage drive as set forth in claim 14 wherein said resilient support means includes a plurality of resilient members respectively supporting said coupling rollers and being pivotally supported on said coupling casing; and wherein said adjusting means is a ring located between said coupling casing and said resilient members.

16. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; a drive shaft mounted on said frame; a tubular coupling casing surrounding said shaft means and being connected to said drive shaft and driven from the same; a plurality of coupling rollers mounted in said coupling casing and being turnable, respectively, about axes extending transverse to said shaft axis, each of said coupling rollers being in frictional engagement with said shaft means and rolling on the same during axial movement of said shaft means, said coupling rollers turning said shaft means when said coupling casing is turned by said drive shaft, said carriage being transported during rotation of said shaft means in one of said inclined transporting positions of said roller means in one direction, and being transported in opposite direction in the other inclinded transporting position of said transporting roller means with said coupling rollers rolling on said shaft means; operating means mounted on said frame and connected to said support for turning the same about said transverse axis between said neutral and transporting positions; a control lever connected to said operating means for actuating the same, said control lever being shiftable between three control positions for shifting said support and said transporting roller means between said transporting positions and said neutral position; stop means on said carriage; a control linkage including a movable member turnably supporting said control lever for movement between said control positions and being movable together with said control lever between a first position in which said control lever is located in the path of said stop means and engaged by the same during movement of said carriage and a second position in which said control lever is passed by said stop means, said stop means shifting said control lever upon engagement with the same to one of said control positions for shifting said support and said transporting roller means from one of said transporting positions to said neutral position during movement of said carriage in one direction of reciprocation; and actuating means connected to said control linkage for moving said member and said control lever between said first and second positions.

17. A carriage drive as set forth in claim 16 and including resilient support means supporting said coupling rollers on said coupling casing.

18. A carriage drive comprising, in combination, a machine frame; a carriage mounted on said frame for reciprocating movement; a shaft means having an axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one supporting roller means mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating one of said means whereby said carriage is transported in one direction in one of said inclined transporting positions of said roller means, and is transported in opposite direction in the other inclined transporting position of said transporting roller means; operating means mounted on said frame and connected to said support for turning the same about said transverse axis; reversing means connected to said operating means for actuating the same, said reversing means being shiftable between two reversing positions for shifting said support and said transporting roller means between said transporting positions; and terminal stops on said carriage engaging said reversing means during movement of said carriage for shifting said reversing means between said reversing positions.

19. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means and is transported in opposite direction in the other inclined transporting position of said transporting roller means; operating means mounted on said frame and connected to said support for turning the same about said transverse axis between said neutral and transporting positions; a control lever connected to said operating means for actuating the same, said control lever being shiftable between two outer control positions and an intermediate control position for shifting said support and said transporting roller means between said transporting positions and said neutral position, respectively; a reversing means mounted on said frame shiftable between two reversing positions and operatively connected to said control lever for shifting the same between said two outer control positions; terminal stops on said carriage engaging said reversing means during carriage movement for shifting said reversing means between said reversing positions; tabulator stop means on said carriage; a control linkage including a movable member turnably supporting said control lever for movement between said control positions and being movable together with said control lever between a first position in which said control lever is located in the path of said tabulator stop means so as to be engaged by the same during carriage movement and a second position in which said control lever is passed by said tabulator stop means, said tabulator stop means shifting said control lever upon engagement with the same to one of said control positions for shifting said support and said transporting roller means from one of said transporting psitions to said neutral position during movement of said carriage; and actuating means connected to said control linkage for moving said member and control lever between said first and second positions.

20. A carriage drive as set forth in claim 19 wherein said control lever has two shoulders; wherein said reversing means has two abutments respectively associated with said shoulders; and wherein in each of said reversing positions, one of said abutments is located in the path of movement of the associated shoulder during movement of said control lever from said first position to the second-position so that upon engagement of each shoulder with the associated abutment said control lever is turned to one of said two outer control postions.

21. A carriage drive as set forth in claim 19 wherein said control lever has two shoulders; wherein said reversing means includes a reversing lever mounted on said frame for pivotal movement between two reversing positions, and a shifting member mounted on said frame and being engaged by said reversing lever to be shifted between two reversing positions, said shifting member having two abutments respectively associated with said shoulders of said control lever; wherein in each of said reversing positions of said shifting member one of said abutments is located in the path of movement of the associated shoulder during movement of said control lever from said first position to said second position so that upon engagement of each shoulder with the associated abutment, said control lever is turned to one of said outer control positions; and wherein said reversing lever is located in the path of said terminal stops so as to be shifted by the same between said two reversing positions.

22. A carriage drive comprising, in combination, a frame; a carriage mounted on said frame for reciprocating movement; carriage transporting means mounted on said frame and operatively connected to said carriage, said carriage transporting means being movable between a neutral inoperative position and two transporting positions for transporting said carriage in opposite directions; means for driving said carriage transporting means; operating means mounted on said frame and connected to said carriage transporting means for moving the same between said neutral and transporting positions; a control lever connected to said operating means for actuating the same, said control lever being shiftable between two outer control positions and an intermediate control position for shifting said carriage transporting means between said transporting positions and said neutral position, respectively; a reversing means mounted on said frame shiftable between two reversing positions and operatively connected to said control lever for shifting the same between said two outer control positions; terminal stops on said carriage engaging said reversing means during carriage movement for shifting said reversing means between said reversing positions; tabulator stop means on said carriage; a control linkage including a movable member turnably supporting said control lever for movement between said control positions and being movable together with said control lever between a first position in which said control lever is located in the path of said tabulator stop means so as to be engaged by the same during carriage movement and a second position in which said control lever is passed by said tabulator stop means, said tabulator stop means shifting said control lever upon engagement with the same to one of said control positions for shifting said support and said transporting roller means from one of said transporting positions to said neutral position during movement of said carriage; and actuating means connected to said control linkage for moving said member and control lever between said first and second positions.

23. A carriage drive comprising, in combination, a frame; a carriage mounted on said frame for reciprocating movement; carriage transporting means mounted on said frame and operatively connected to said carriage, said carriage transporting means being movable between a neutral inoperative position and two transporting positions for transporting said carriage in opposite directions; means for driving said carriage transporting means; operating means mounted on said frame and connected to said carriage transporting means for moving the same between said neutral and transporting positions; a control lever connected to said operating means for actuating the same, said control lever being shiftable between three control positions for shifting said carriage transporting means between said transporting positions and said neutral position; tabulator stop means on said carriage; a control linkage including a movable member turnably supporting said control lever for movement between said control positions and being movable together with said control lever between a first position in which said control lever is located in the path of said tabulator stop means and engaged by the same during movement of said carriage and a second position in which said control lever is passed by said tabulator stop means, said tabulator stop means shifting said control lever upon engagement with the same to one of said control positions for shifting said carriage transporting means from one of said transporting positions to said neutral position during movement of said carriage; and actuating means driven from said drive means and connected to said control linkage for moving said member and said control lever between said first and second positions.

24. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means and is transported in opposite direction in the other inclined transporting position of said transporting roller means; operating means mounted on said frame and connected to said support for turning the same about said transverse axis between said neutral and transporting positions; a control lever connected to said operating means for actuating the same, said control lever being shiftable between two outer control positions and an intermediate control position for shifting said support and said transporting roller means between said transporting positions and said neutral position, respectively; a latch member pivotally mounted on said control lever turnable in one direction; a spring connecting said latch member with said control lever and urging said latch member to turn in an opposite direction; tabulator stop means on said carriage; a control linkage including a movable member turnably supporting said control lever for movement between said control positions and being movable together with said control lever between a first position in which said control lever is located in the path of said tabulator stop means so as to be engaged by the same during carriage movement and a second position in which said control lever is passed by said tabulator stop means, said tabulator stop means shifting said control lever upon engagement with the same to one of said control positions for shifting said support and said transporting roller means from one of said transporting positions to said neutral position during movement of said carriage, said tabulator stop means engaging said latch member during carriage movement in one direction and turning the same against the action of said spring so as to pass beyond said latch member, said tabulator stop means turning, during carriage movement in opposite direction, said control lever through said latch member into one of said control positions whereby the carriage movement is reversed and said carriage starts again to move in said one direction; and actuating means connected to said control linkage for moving said member and control lever between said first and second positions.

25. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means and is transported in opposite direction in the other inclined transporting position of said transporting roller means; operating means mounted on said frame and connected to said support for turning the same about said transverse axis between said neutral and transporting positions; a control lever connected to said operating means for actuating the same, said control lever being shiftable between two outer control positions and an intermediate control position for shifting said support and said transporting roller means between said transporting positions and said neutral position, respectively; a latch member pivotally mounted on said control lever turnable in one direction; a spring connecting said latch member with said control lever and urging said latch member to turn in an opposite direction; a reversing means mounted on said frame shiftable between two reversing positions and operatively connected to said control lever for shifting the same between said two outer control positions; terminal stops on said carriage engaging said reversing means during carriage movement for shifting said reversing means between said reversing positions; tabulator stop means on said carriage; a control linkage including a movable member turnably supporting said control lever for movement between said control positions and being movable together with said control lever between a first position in which said control lever is located in the path of said tabulator stop means so as to be engaged by the same during carriage movement and a second position in which said control lever is passed by said tabulator stop means, said tabulator stop means shifting said control lever upon engagement with the same to one of said control positions for shifting said support and said transporting roller means from one of said transporting positions to said neutral position during movement of said carriage, said tabulator stop means engaging said latch member during carriage movement in one direction and turning the same against the action of said spring so as to pass beyond said latch member, said tabulator stop means turning, during carriage movement in opposite direction, said control lever through said latch member into one of said control positions whereby the carriage movement is reversed and said carriage starts again to move in said one direction; and actuating means connected to said control linkage for moving said member and control lever between said first and second positions.

26. A carriage drive comprising, in combination, a machine frame; a carriage mounted on said frame for reciprocating movement; a shaft means having a shaft axis extending in direction of reciprocating movement of said carriage, said shaft means being supported on said carriage for turning movement and non-movable in direction of reciprocation; a carriage transporting means mounted on said frame for turning movement and non-movable in direction of reciprocation, said carriage transporting means including at least one support and at least one transporting roller means engaging said shaft means and being mounted on said support for turning movement about a roller axis, said support and said transporting roller means being turnable about an axis transverse to said shaft axis and to said roller axis between a neutral position in which said roller axis is parallel to said shaft axis, and two transporting positions in which said roller axis is inclined in opposite directions to said shaft axis; drive means for rotating said shaft means whereby said carriage is transported in one direction in one of said inclined transporting positions of said roller means and is transported in opposite direction in the other inclined transporting position of said transporting roller means; operating means mounted on said frame and connected to said support for turning the same about said transverse axis between said neutral and transporting positions; a control lever connected to said operating means for actuating the same, said control lever being shiftable between two outer control positions and an intermediate control position for shifting said support and said transporting roller means between said transporting positions and said neutral position, respectively; a reversing means mounted on said frame shiftable between two reversing positions and operatively connected to said control lever for shifting the same between said two outer control positions; terminal stops on said carriage engaging said reversing means during carriage movement for shifting said reversing means between said reversing positions; tabulator stop means on said carriage; a control linkage including a cam follower and a movable member turnably supporting said control lever for movement between said control positions and being movable together with said control lever between a first position in which said control lever is located in the path of said tabulator stop means so as to be engaged by the same during carriage movement and a second position in which said control lever is passed by said tabulator stop means, said tabulator stop means shifting said control lever upon engagement with the same to one of said control positions for shifting said support and said transporting roller means from one of said transporting positions to said neutral position during movement of said carirage; actuating means including a cam cooperating with said cam follower for moving said member and said control lever between said first and second positions; and locking means for locking said cam follower in a position in which said movable member of said control linkage and said control lever are in said second position, said locking means being operatively connected to said reversing means to be actuated by the same in one of said reversing positions corresponding to a return movement of said carriage whereby said tabulator stops are rendered inoperative during carriage return movement.

27. A carriage drive as set forth in claim 26 wherein said cam follower is a pivoted bell-crank lever; and wherein said locking means includes a spring loaded locking member movable to a locking position for engaging said cam follower lever, and linkage means connecting said locking member with said reversing means.

28. A driving arrangement comprising, in combination, a support, a driven shaft means mounted on said support movable in axial direction and turnable; a drive shaft; a tubular coupling casing surrounding said driven shaft and being connected to said drive shaft and driven from the same; a plurality of coupling rollers mounted on said coupling casing and being turnable, respectively, about axes extending transverse to the axis of said driven shaft, each of said coupling rollers being in frictional engagement with said driven shaft and rolling on the same during axial movement of said driven shaft, said coupling rollers turning said driven shaft when said coupling casing is turned by said drive shaft.

29. A driving arrangement as set forth in claim 28 and including a plurality of resilient members respectively supporting said coupling rollers and being pivotally supported on said coupling casing; and adjusting means located between said coupling casing and said resilient members for urging said coupling rollers at variable contact pressure against said shaft means.

30. A driving arrangement as set forth in claim 28 and including a resilient drum having a plurality of peripheral circular grooves and surrounding said coupling casing; and a cylindrical drive member mounted on said drive shaft and being in frictional engagement with said resilient drum for driving said shaft through said coupling casing and said coupling rollers.

References Cited in the file of this patent

UNITED STATES PATENTS

| | | |
|---|---|---|
| 2,709,511 | Dicke | May 31, 1955 |
| 2,777,560 | Campos | Jan. 15, 1957 |